(12) United States Patent
Ironi et al.

(10) Patent No.: US 7,174,415 B2
(45) Date of Patent: Feb. 6, 2007

(54) SPECIALIZED MEMORY DEVICE

(75) Inventors: Alon Ironi, Haifa (IL); Shachaf Zak, Ashdod (IL)

(73) Assignee: Zoran Corporation, Sunnyvale, CA (US)

( * ) Notice: Subject to any disclaimer, the term of this patent is extended or adjusted under 35 U.S.C. 154(b) by 186 days.

(21) Appl. No.: 10/166,042

(22) Filed: Jun. 11, 2002

(65) Prior Publication Data

US 2003/0012062 A1    Jan. 16, 2003

Related U.S. Application Data

(60) Provisional application No. 60/296,733, filed on Jun. 11, 2001.

(51) Int. Cl.
*G06F 12/00* (2006.01)

(52) U.S. Cl. ........................ 711/5; 365/230.03

(58) Field of Classification Search ........ 711/150–152; 345/541, 542
See application file for complete search history.

(56) References Cited

U.S. PATENT DOCUMENTS

| | | | |
|---|---|---|---|
| 5,396,641 A | 3/1995 | Iobst et al. ................. 395/800 |
| 5,678,021 A | 10/1997 | Pawate et al. .............. 395/431 |
| 5,761,719 A * | 6/1998 | Mahin et al. ................ 711/139 |
| 5,815,167 A * | 9/1998 | Muthal et al. ............... 345/541 |
| 5,854,638 A | 12/1998 | Tung ........................... 345/512 |
| 5,870,625 A * | 2/1999 | Chan et al. ..................... 710/5 |
| 5,941,968 A * | 8/1999 | Mergard et al. ............ 710/308 |
| 6,000,027 A | 12/1999 | Pawate et al. ................ 712/39 |
| 6,020,903 A | 2/2000 | Jun ............................. 345/512 |
| 6,026,478 A | 2/2000 | Dowling ....................... 712/24 |
| 6,070,002 A | 5/2000 | Hagemark et al. ........ 395/200.8 |
| 6,170,048 B1 * | 1/2001 | Wing So ....................... 712/35 |
| 6,185,704 B1 | 2/2001 | Pawate et al. .............. 714/719 |
| 6,330,646 B1 * | 12/2001 | Clohset et al. .............. 711/158 |
| 6,381,671 B1 | 4/2002 | Ayukawa et al. ........... 711/104 |
| 6,584,588 B1 | 6/2003 | Pawate et al. .............. 714/719 |

FOREIGN PATENT DOCUMENTS

| | | |
|---|---|---|
| EP | 0 446 721 A2 | 9/1991 |
| JP | 5342140 | 12/1993 |
| JP | 6208632 | 7/1994 |
| JP | 221313/1996 | 8/1996 |
| JP | 10289151 | 10/1999 |
| JP | 2000021160 | 1/2000 |

OTHER PUBLICATIONS

Intel 82810/82810-DC100 Graphics and Memory Controller Hub (GMCH), Intel Corporation, 1999, pp. 1-17.*
IEEE 100: The Authoritative Dictionary of IEEE Standards Terms, 7th Ed., IEEE Press, Dec. 2000, pp. 123 and 949.*
Murakami, K., "Columubus's Egg," PEMM Combination of CPU and DSP, Monthly Electronics Magazine, vol. 44, 4th Ed., Apr. 1, 1999, pp. 77-81.
European Search Report for EP Application No. 02012940, dated May 22, 2006.

* cited by examiner

*Primary Examiner*—Mano Padmanabhan
*Assistant Examiner*—Kaushik Patel
(74) *Attorney, Agent, or Firm*—Morgan, Lewis & Bockius LLP

(57) ABSTRACT

A specialized memory chip which includes an embedded application specific signal processing unit ASSPU. The ASSPU handles one or more predetermined tasks instead of a main processing unit. The ASSPU and the main processing unit can access memory on the memory chip simultaneously.

26 Claims, 15 Drawing Sheets

SPECIALIZED MEMORY DEVICE

The present application claims the benefit of U.S. Provisional Appln. No. 60/296,733, filed Jun. 11, 2001.

FIELD OF THE INVENTION

This invention relates to parallel processing.

BACKGROUND OF THE INVENTION

FIG. 1 shows a block diagram of a prior art CPU-based system 100 implementing a cellular phone with video capability comprising the following modules: a CPU 110, a color LCD module 120, a camera 125, a keypad 130, a CPU memory 140, a modem 150 (modem for example being implemented by a DSP), an RF transceiver 160, a flash memory 170, an EPROM 180, a SIM Card 190, and an audio codec 105. In operation, intercepted video and/or graphics data is received through RF transceiver 160 and modem 150, and processed by CPU 110. CPU 110 transfers the video and/or graphics data to memory 140 for temporary storage during the processing. The processed data is output on LCD 120. Outgoing video and/or graphics data is received from camera 125 and processed by CPU 110. CPU 110 transfers the video and/or graphics data to memory 140 for temporary storage during the processing. The processed data is transmitted out through modem 150 and RF transceiver 160. Flash memory 170 and EPROM 180 store the CPU program and constant parameters.

In order to enable video capability, CPU 110 must be provided with software to handle video and graphics. Special instructions (often termed multi-media extension instructions) are designed for CPU 110, and video/graphics instructions are executed in series with other instruction. In addition, the frequency of CPU 110 must be increased compared to a CPU in a system without video capability so as to meet the real time requirement. The increased clock frequency linearly increases power consumption.

An additional source of power loss relates to the data transfer across the input/output pins (interconnect) between the CPU 110 IC and the memory 140 IC. This kind of data traffic involves charge/discharge of a large capacitive load on the input/output buffers and therefore large power consumption. Quantitatively, the amount of power wasted over the input/output pins of memory IC 140 is given by:

$$P_I = P_{ID} + P_{IC}$$

where $P_{ID}$ is the power consumed over the data pins, and $P_{IC}$ is the power consumed over the control and address pins. Typically, the former is much lager than the latter, and $$P_{ID} = C_{IO} * V_{IO}^2 * 0.5 * B_{IO}$$

where
$C_{IO}$ is the capacitive load of the external data bus, in Farads.
$V_{IO}$ is the supply voltage of the I/O of the memory device, in Volts.
$B_{IO}$ is the effective bandwidth of the transactions over the data bus, in bits/second For example for a typical DRAM memory IC, the wasted power can be approximated as follows:
$C_{IO} = 10*10^{-12}$ Farad
$V_{IO} = 2.5$ Volts
$B_{IO} = 200*10^6$ bits/sec, thus
$P_{ID} = 10*10^{-12}*2.5^2*0.5*200*10^6 = 6.25$ mW and therefore $P_I > 6.25$ mW In another prior art system 200 of a cellular phone with video capability illustrated in FIG. 2, a signal processing core 215 can be embedded on the same die with a CPU 210, with core 215 handling the video and graphic tasks. Because the video and graphic tasks are handled by core 215, the clock frequency of CPU 210 need not be increased beyond the frequency of a CPU for a cellular phone without video capability, and therefore the power that would have been wasted by the increased frequency is conserved. However, system 200 is nevertheless not very efficient from the power consumption standpoint because the IC including CPU 210 and core 215 still exchanges a lot of data with memory 140 and therefore consumes a lot of power (see above approximation) across the interconnect between the CPU 210 IC and memory 140 IC.

FIG. 3A illustrates another prior art system 300 of a cellular phone with video capability. A general purpose or application specific digital signal processor (DSP) 385 is placed external to a CPU 310. DSP 385 handles the video and graphics tasks while CPU 310 handles the other tasks. Therefore there is no requirement to increase the clock frequency of CPU 310 compared to a CPU in a cellular phone without video capability. However DSP 385 requires an additional memory 395, for example a DRAM or RAM 395 which can either be embedded within DSP 385 or placed as an off-the-shelf memory IC external to DSP 385 and connected to DSP 385.

FIG. 3B shows a similar system 320 with application specific CPU 380 and an SDRAM 390 replacing DSP 385 and (D)RAM 395.

Both systems 300 and 320 have an increased IC count compared to systems 100 and 200 and therefore an increased size and cost. Systems 300 and 320 are also not power efficient because data has to be moved between CPU 310 and memory 140, between CPU 310 and DSP 385 or application specific CPU 380, and between DSP 385 or application specific CPU 380 and memory 395 or 390, consuming a lot of power. The data transfers between DSP 385 or application specific CPU 380 and memory 395 or 390 is typically (although not necessarily) the highest traffic of the data transfers listed above for systems 300 and 320, and therefore the most wasteful in power because video compression/decompression algorithms require multiple accesses to the data There are also related art systems which include a processor embedded in CPU memory.

U.S. Pat. No. 6,026,478 to Dowling describes a VLIW (very large instruction word) processor that is connected to an embedded DRAM VLIW extension processor, that also functions as the DRAM of the VLIW CPU. U.S. Pat. No. 6,026,478 partitions the allocation of tasks between the CPU and the embedded DRAM processor at the instruction level.

As a result of splitting the program at the instruction level, the amount of data (where "data" includes instructions) exchanges between the CPU and the embedded DRAM processor is decreased by a certain amount with respect to a regular CPU-DRAM paradigm. The disadvantage of the system is in the required complexity. For example, the embedded memory processing unit needs to sense the stream of instructions that are executed at the same time by the CPU, and the embedded memory processing unit needs to share the instruction caching of the CPU. In addition, there are still significant data exchanges between the CPU and the DRAM in order to synchronize the execution at the instruction level.

U.S. Pat. No. 5,396,641 to Iobst et al. describes a single instruction multiple data (SIMD) and multiple instruction multiple data (MIMD) processors integrated with DRAM. Each type of processor has an external DRAM interface (i.e., the DRAM can be accessed as a common DRAM). However, there are extra control lines for operating the embedded processor from an external "host".

Moreover the invention disclosed in U.S. Pat. No. 5,396,641 does not support simultaneous internal processing and external data transfers. An internal computation cycle can only take place instead of a memory access cycle. This approach makes it impossible to use the embedded DRAM processor at the same time as the CPU uses the embedded DRAM as its main memory.

U.S. Pat. No. 5,678,021 to Pawate et al. discloses a smart memory that includes a data storage and a processing core for executing instructions stored in the data storage area. Externally, the smart memory is directly accessible as a standard memory device. However the smart memory does not support simultaneous internal processing and external data transfers. An internal computation cycle can only take place instead of a memory access cycle. This approach makes it impossible to use the processing core at the same time as the CPU uses the data storage as its main memory.

What is needed in the art is a logic embedded memory where the memory can be accessed simultaneously by an embedded ASSPU and by an main processing unit.

SUMMARY OF THE INVENTION

The invention provides for a specialized memory device comprising:

a memory module, which includes at least two separate memory banks, including at least one specialized memory bank and at least one regular memory bank;

an application specific signal processing unit ASSPU which is embedded on the same die with said memory module, and bas a read/write access to said at least one specialized memory bank via an internal bus, said ASSPU configured to execute at least one pre-determined task;

a bus interface coupling an external main processing unit to said memory module, said bus interface enables said main processing unit to access said at least one specialized memory bank in respect of data related to at least one of said at least one predetermined tasks executable by said ASSPU, and enables said main processing unit to access said at least one regular memory bank; and a traffic management unit TMU which allows access to at least one of said at least one specialized bank by said ASSPU simultaneously with access to at least one of said at least one regular memory bank by said main processing unit.

The invention further provides for a method for sharing memory in a memory module between a main processing unit and an application specific signal processing unit ASSPU which is embedded on the same die as the memory module, wherein, the memory module includes at least one bank shared by the main processing unit and the ASSPU and at least one regular bank accessible by the main processing unit, the method comprising:

determining whether the main processing unit desires to access a bank of the memory module which is shared by the main processing unit and by the ASSPU, in respect of data related to a predetermined task executable by the ASSPU; and if said determination is that the main processing unit desires to access a non-shared (regular) bank of the memory module, allowing access to said non-shared bank by the main processing unit and allowing the ASSPU to access said shared bank simultaneously.

Yet further, the invention provides for a specialized memory device comprising:

a memory module, which includes at least one specialized memory bank;

an application specific signal processing unit ASSPU, which is embedded on the same die with said memory module, and has a read/write access to said at least one specialized memory bank via an internal bus, said ASSPU configured to execute at least one pre-determined task;

a bus interface coupling a main processing unit to said memory module, said bus interface enables said main processing unit to access at least one register of said ASSPU mapped to at least one address of said at least one specialized bank;

and a traffic management unit TMU which allows access by said main processing unit to at least one of said at least one registers and allows access by said ASSPU to at least one of said at least one specialized memory bank which includes said at least one of said at least one addresses, simultaneously.

Still further, the invention provides for a method for sharing memory on a memory module between a main processing unit and an application specific signal processing unit ASSPU which is embedded on the same die as the memory module and is configured to execute at least one pre-determined task, the memory module including at least one specialized memory bank, the method comprising:

determining whether the main processing unit desires to access one of at least one predetermined addresses in one of said at least one specialized memory bank;

if said determination is that the main processing unit desires to access one of said at least one predetermined address in one of said at least one specialized banks, allowing access to at least one register of said ASSPU which is mapped to said one address by the main processing unit; and during said main processing unit access, allowing said ASSPU to access said one specialized bank which includes said one address, if said ASSPU so desires.

The invention provides for a method for sharing memory on a memory module between a main processing unit and an application specific signal processing unit ASSPU which is embedded on the same die as the memory module and is configured to execute at least one pre-determined task, the memory module including at least one specialized memory bank, the method comprising:

determining whether the main processing unit desires to access one of at least one specialized memory bank;

if said determination is that the main processing unit desires to access one of said at least one specialized banks, allowing the main processing unit to access indirectly said one specialized bank; and during said main processing unit access, allowing said ASSPU to access directly said one specialized bank if said ASSPU so desires.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Glossary

Figure 1:
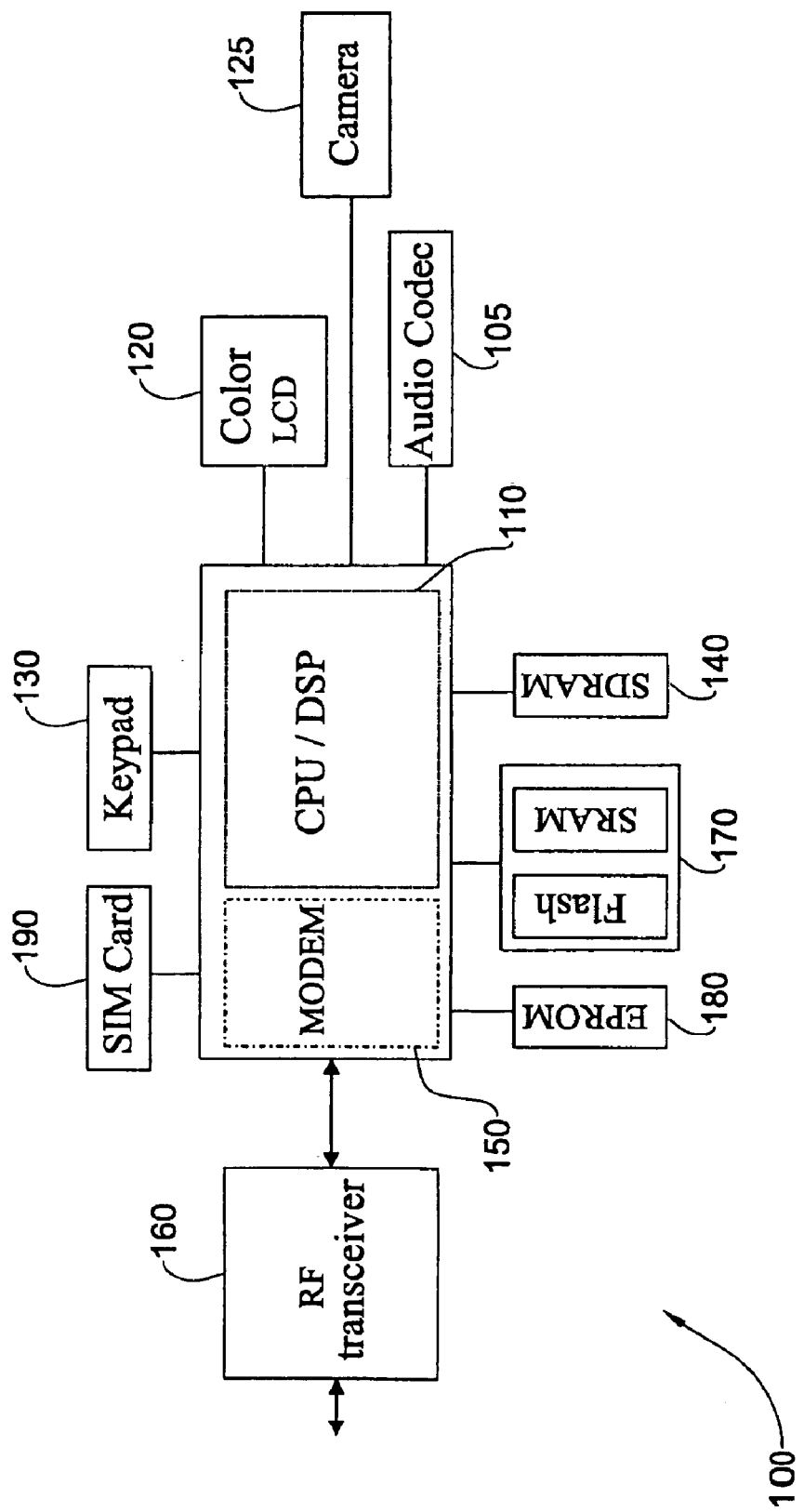
FIG. 1 is a block diagram of a poor art cellular phone with video capability.
Figure 2:
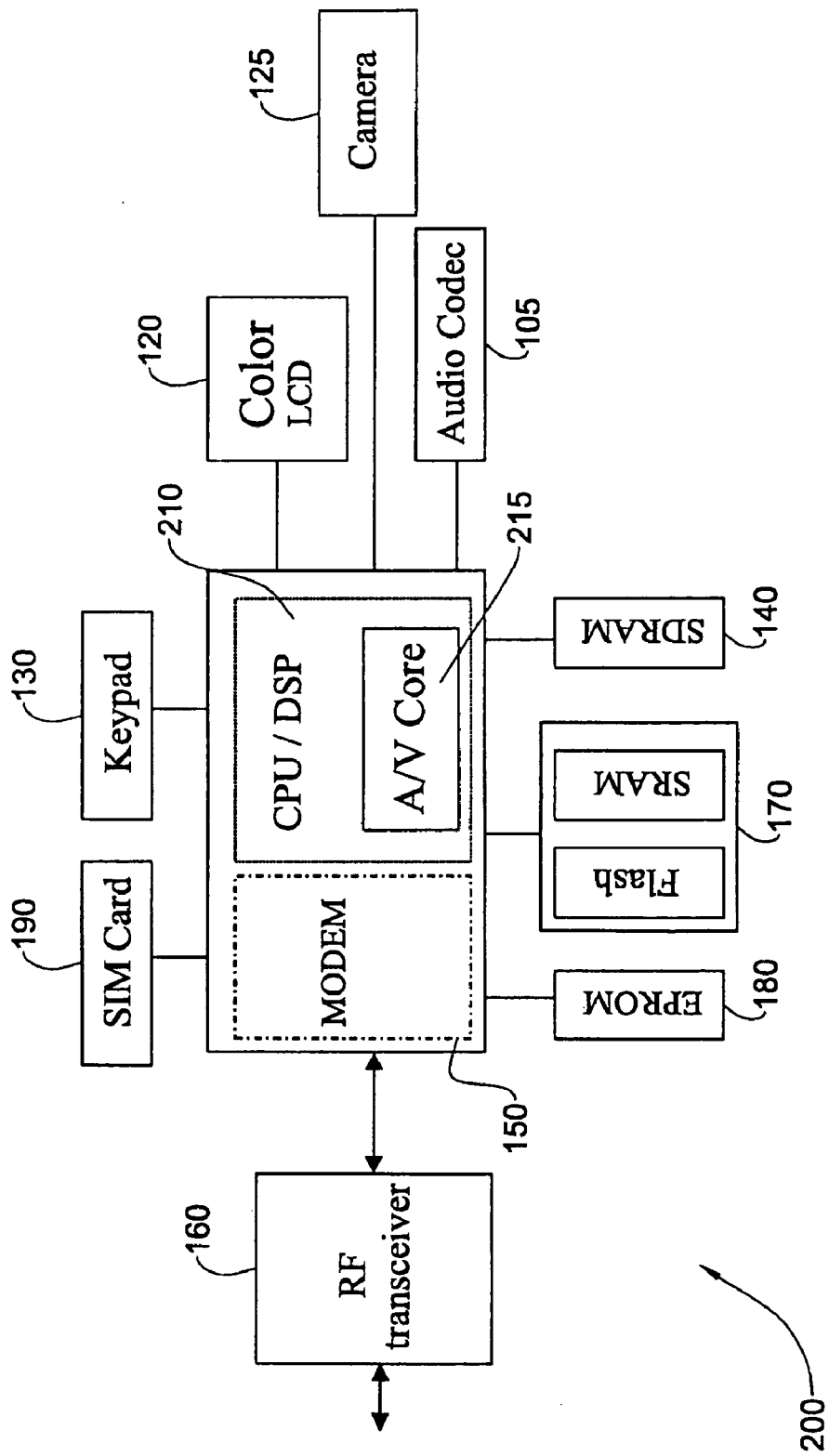
FIG. 2 is a block diagram of another prior art cellular phone with video capability.
Figure 3A:
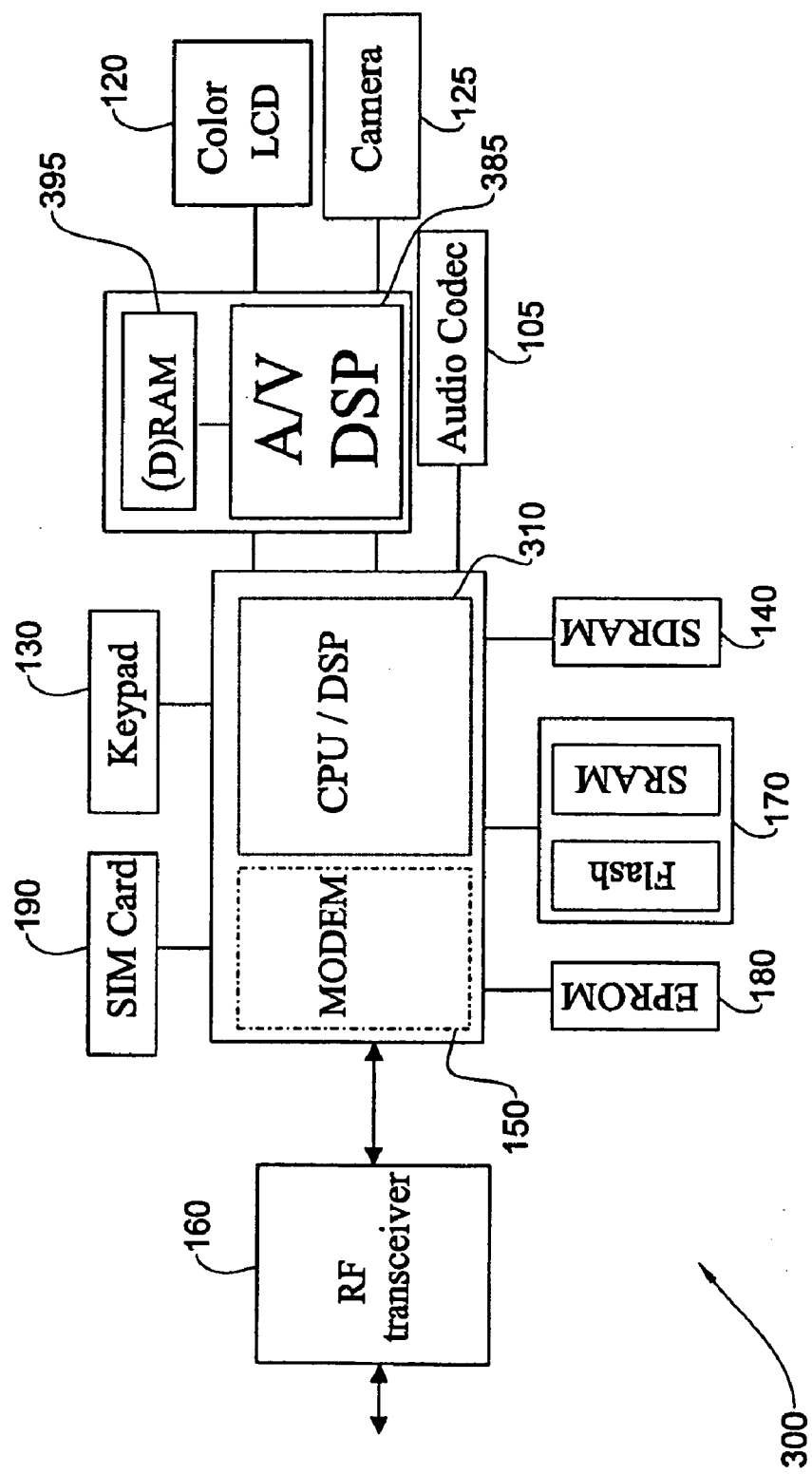
FIG. 3A is a block diagram of yet another prior art cellular phone with video capability.
Figure 3B:
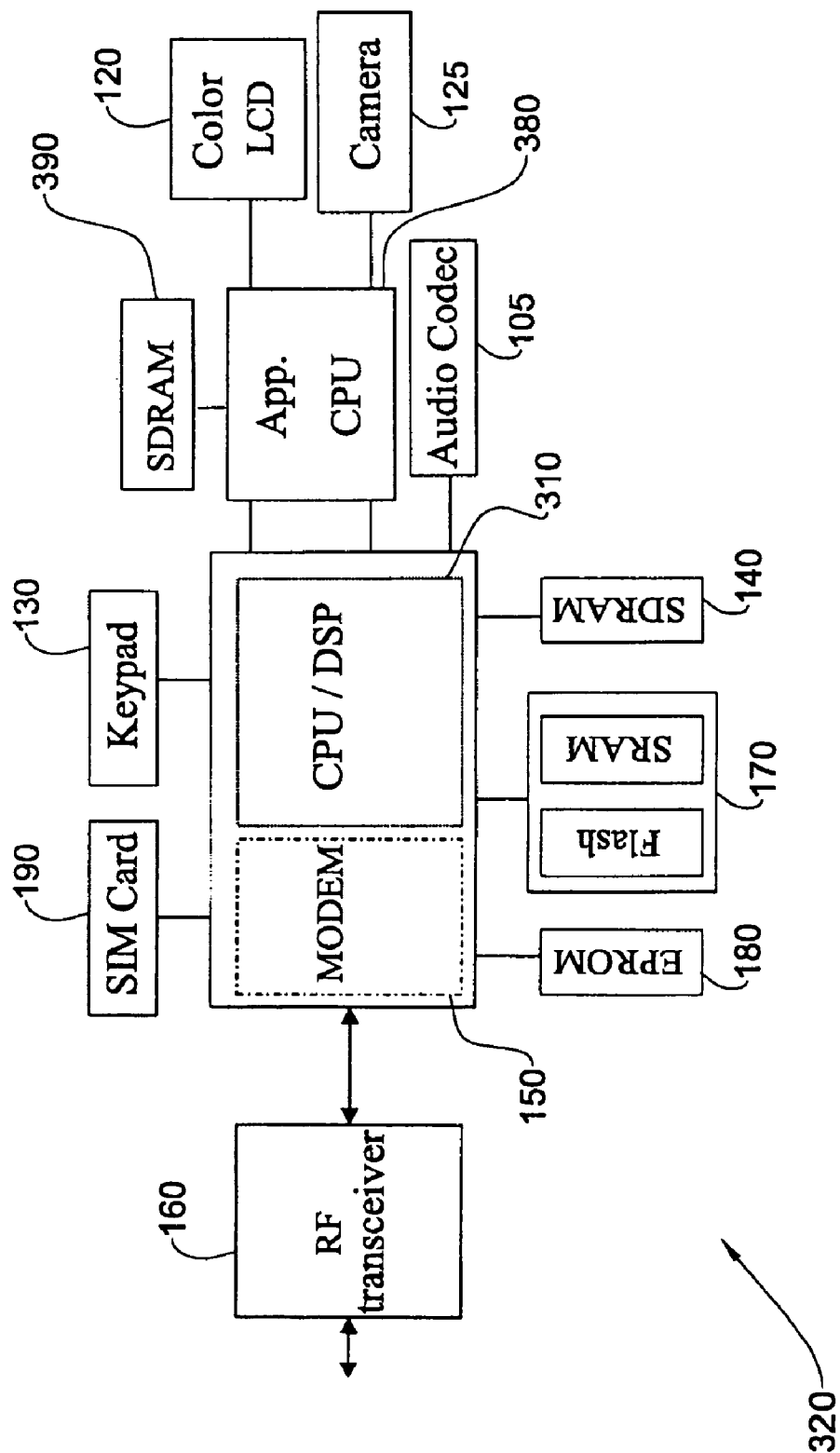
FIG. 3B is a block diagram of still yet another prior art cellular phone with video capability.

ASSPU: Application-Specific Signal Processing Unit. A digital signal processing logic unit, which may or may not contain a programmable processor, and is designed optimized to handle one or a few similar specific processing tasks.

Cache: a relatively small, very fast block of memory that is used by a CPU or DSP for its most frequent data transactions. The cache bridges between the CPU (or DSP) and its main memory, which is typically slower. The most common implementation of cache is a fast SRAM (with additional logic).

CPU: Central Processing Unit A unit which constitutes whole or a part of an IC, that runs and executes a software program which controls all (or most of) other components in an electronic system.

DRAM: Dynamic Random Access Memory. A RAM that needs occasional "refresh" operations in order not to lose its content. DRAM is basically less expensive and consumes less power than SRAM. Due to its lower price, DRAM is the common solution for a CPU's main memory.

DSP: Digital Signal Processor. A special type of processing unit, which is optimized for mathematical processing of numerical data.

Flash Memory: type of a permanent storage media, i.e., memory that retains its data even when not connected to a power supply. Flash memory is based on semiconductor, has access time that is slower than RAM (especially for write), but faster than most other permanent storage media.

IC: Integrated Circuit. A complex electronic circuit made on a die of semi-conductor, which constitutes one separate physical entity in a more complex electronic system.

LCD: Liquid Crystal Display. A low power mechanism for electronic display of color images that is based on applying electrical field with variable amplitude on a liquid crystal. This method is used in most low power appliances: lap-top PC, Palm PCs, cellular phones, digital cameras, etc.

RAM: Random Access Memory. A single IC, or an array of ICs, that stores bits of digital information. The information can be accessed for read or write (of new information) in any random order.

SRAM: Static Random Access Memory. A RAM, that can store its content as long as it is connected to power supply, without the need for a "refresh" operation. SRAM is basically more expensive and consumes more power than DRAM, but support faster data transactions, especially for transactions of single or dual data words.

(Digital TV) Set-top box: an electronic appliance that receives digital, compressed, optionally encrypted multimedia signal via cable, satellite, or terrestrial, processes the signal and sends it to display on a monitor.

Any embodiment applying the invention includes a main processing unit IC perhaps with other peripheral processing and interface and communication modules on the same IC, and a main memory IC with an embedded ASSPU. The main processing unit can be for example, a core with two processors (CPU/DSP), a CPU or a DSP. The main memory can be for example DRAM, SRAM or a combination that mixes DRAM and SRAM. In the description below for ease of explanation, it is assumed that the main processing unit is a CPU and the to memory is DRAM. It is also assured in many of the embodiments described below that the processed data is output to a color LCD but other outputs may be used in alternative preferred embodiments.

Preferably, the ASSPU handles one or more system tasks (i.e. functions) which are memory intensive while the CPU handles other tasks. Data exchanges between the CPU and the main memory are therefore reduced, lowering power consumption. In addition, neither an extra IC is added, nor its accompanying added cost and size. Typically but not necessarily, tasks are at the level of a sub-application (for example the frame level), rather than at the instruction level or at the level of a group of instructions. Functions that are allocated to the ASSPU are generally excluded or eliminated from the program of the CPU. An example of such a function can be compressing an image, decompressing an image, converting an image from one color space to another, etc.

Note that if the allocation is at a level other than the instruction level or group of instructions level, the synchronization between the ASSPU and CPU may be simplified compared to an allocation at the instruction level, for example because there is no need for the ASSPU to share the instruction caching of the CPU.

In one preferred embodiment of the present invention, the physical interface between the CPU IC and the DRAM IC (including the ASSPU) conforms with the industry standard of physical interfaces between CPU IC and a regular DRAM IC (without the ASSPU). In another preferred embodiment of the invention, dedicated control and/or status lines are added. For example, added pins can be used for an interrupt signal to the CPU, and/or for a signal indicating that the access is related to the tasks performed by the ASSPU rather than being a regular memory access (in embodiments where the address of the access is not used for distinguishing the type of access).

Figure 4:
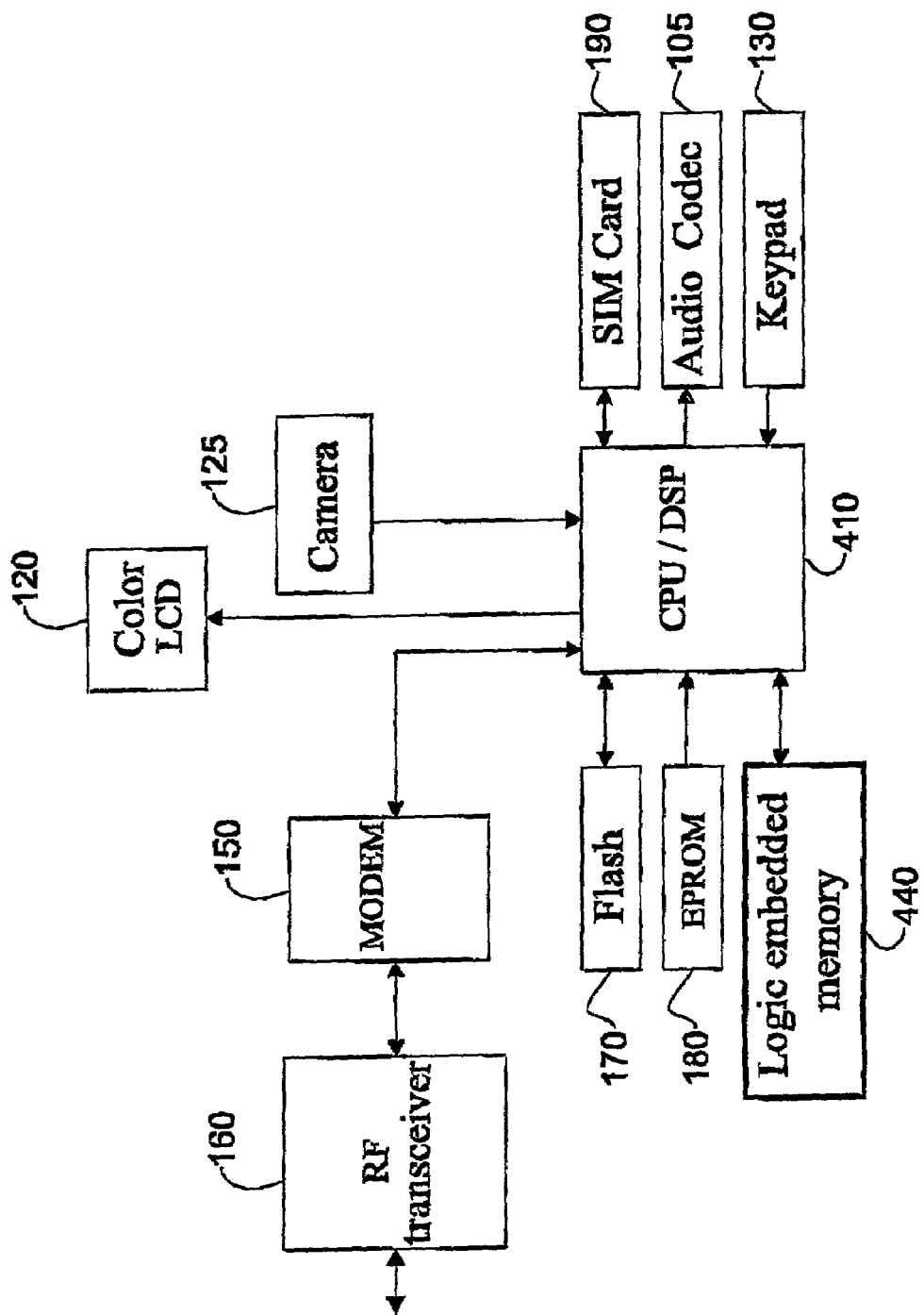
FIG. 4 is a block diagram of a cellular phone with video capability, according to a preferred embodiment of the present invention.

FIG. 4 illustrates a preferred embodiment of the present invention of a cellular phone with video capability. A CPU 410 differs from a CPU without video capability in that CPU 410 requires a software device driver for communicating with the ASSPU within the logic embedded memory 440. CPU 410 transfers video and/or graphics data to logic embedded memory 440.

Figure 5:
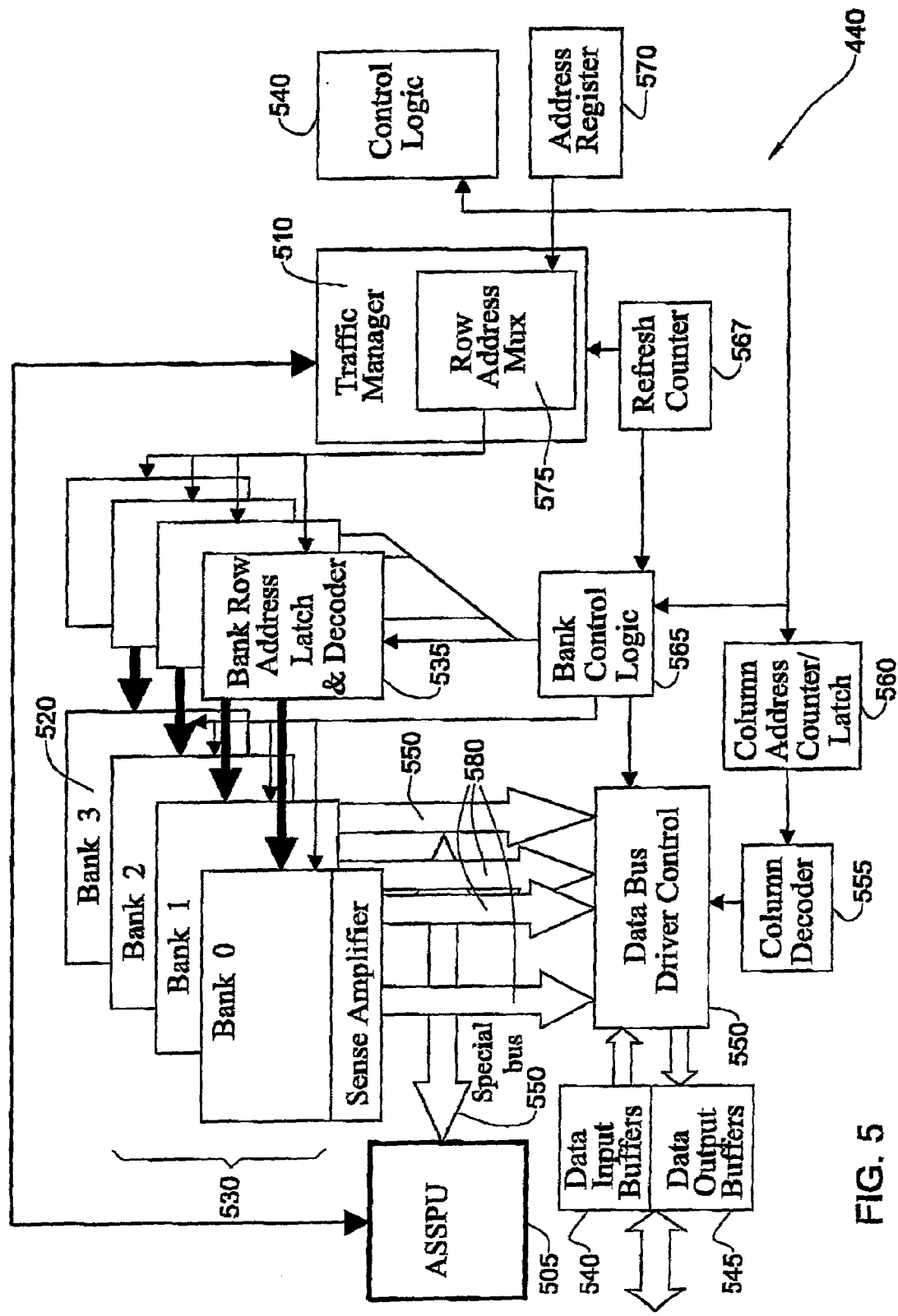
FIG. 5 is a block diagram of the internal structure of a logic embedded memory, according to a preferred embodiment of the present invention.

Refer to FIG. 5 which shows the internal structure of logic embedded memory 440, in accordance with a preferred embodiment of the present invention. Except for a traffic management unit 510, an ASSPU 505 and a specialized data bank 520, the rest of the modules are common to DRAM design and will therefore not be her discussed. In this example there is assumed to be four data banks, of which one data bank 520 is a specialized bank which can be accessed by CPU 410 and ASSPU 505 and the other three banks 530 are regular banks used only by CPU 410. For example, CPU 410 can access regular banks 530 in the case of cache misses, i.e. if the data CPU 410 attempts to read is not in the cache memory, CPU can read the data from banks 530. It should be evident that the preferred embodiment illustrated in FIG. 5 is not bound by the 1:3 specialized: regular banks split and only requires at least one specialized bank and at least one regular bank.

A special bus 550 connects ASSPU 505 with specialized bank 520. In the description below and appended claims, the terms "bus" and "bus interface" should be construed to include a plurality of "buses" and "bus interfaces", respectively. Typically but not necessarily, special bus 550 is wider than the other buses 580 inside logic embedded memory 440 to allow ASSPU 505 maximum utilization of specialized bank 520 and operation at a low frequency.

ASSPU 505 processes the image/video data, for example by compressing, decompressing, filtering etc. Results are temporarily stored in specialized bank 520.

Traffic management unit (TMU) 510 allows CPU 410 and ASSPU 505 to share access to specialized bank 520. CPU 410 typically although not necessarily does not access specialized bank 520 except for feeding ASSPU 505 with new data or acquiring results of processing by ASSPU 505. TMU 510 distinguishes between video and/or graphics data from other data and therefore CPU 410 access to specialized bank 520 rather than regular banks 530 based preferably on either the address range exhibited on the memory address bus of CPU 410 or special dedicated signals within the interface between CPU 410 and embedded memory 440 (for example connected to control logic 540). For example, the dedicated signals can include a signal set high by CPU 410 to indicate that the data is video/graphics data and set low by CPU 410 to indicate other (general purpose) data.

In one preferred embodiment based on FIG. 5, CPU 410 has priority in case of conflict. If the conflict arises during a CPU read, TMU 510 stalls the cycle while signaling to ASSPU 505 to release access of specialized bank 520. Once specialized bank 520 is accessible by CPU 410, tie CPU read cycle is completed and subsequent ASSPU 505 can resume access.

In case of a CPU write, TMU 510 buffers the written data, while signaling ASSPU 505 to release access of specialized bank 520. Once specialized bank 520 is accessible to CPU 410, TMU 510 emulates a CPU write cycle, starting with the data that was temporarily buffered. Similarly, if CPU 410 is first in accessing specialized bank 520, TMU 410 prevents access by ASSPU 505.

In certain cases, conflict can be minimized or eliminated through synchronization of CPU 410 with respect to the specific application. For example, in case of video decompression, CPU 410 may suite the compressed data to a pre-defined buffer in memory 440, notify ASSPU 505 of that via a command data word that is delivered across the external memory interface, and write the next load of compressed data to another buffer, notify ASSPU 505 and so forth. This scheme of double or multiple buffers uses some extra memory space, but allows for a safe, sustained arbitration of memory portions to CPU 410 and ASSPU 505 without creating conflict situations.

Figure 12:
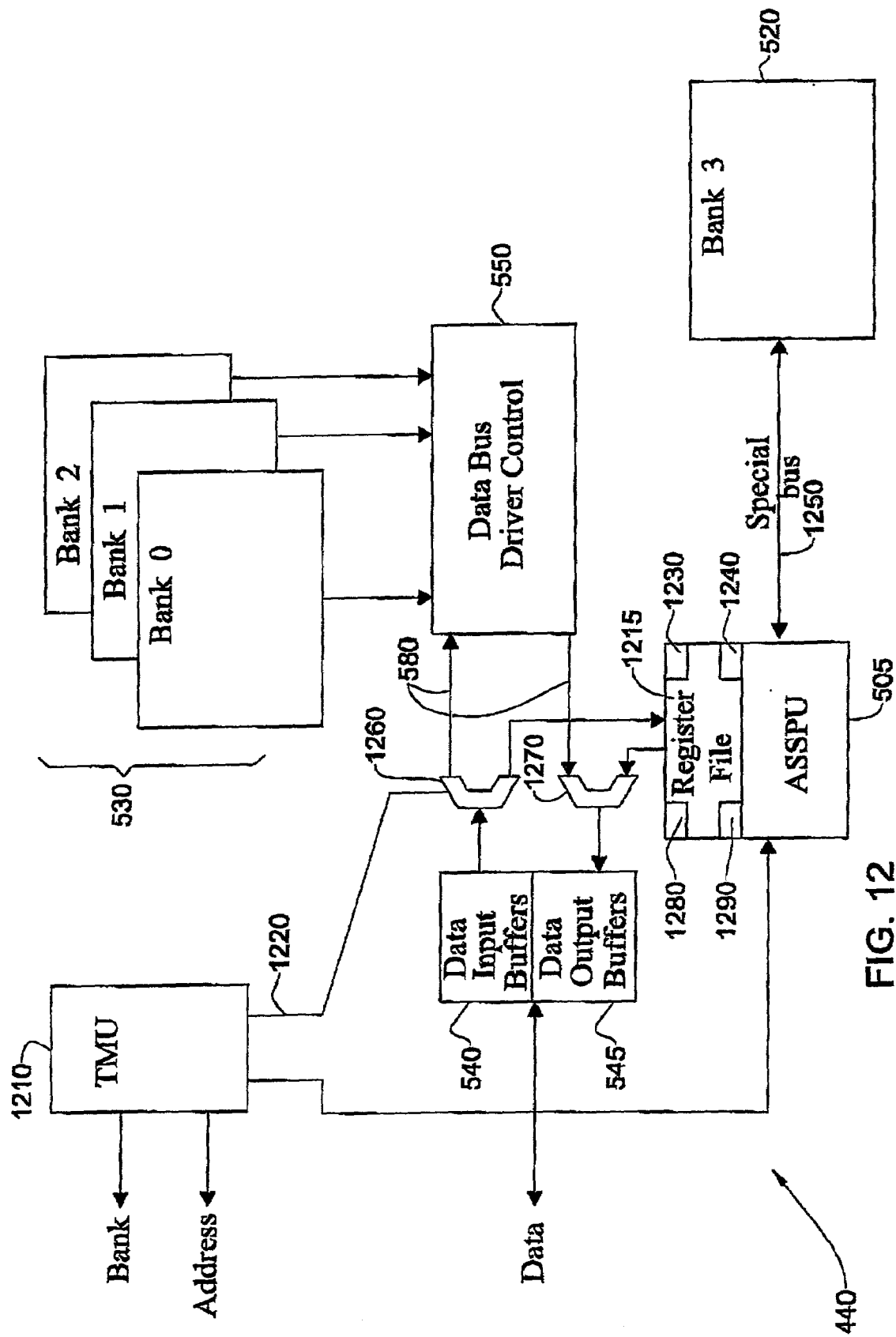
FIG. 12 is a block diagram of the internal structure of a logic embedded memory, according to another preferred embodiment of the present invention.

Another preferred embodiment of the internal configuration of embedded memory 440 is illustrated in FIG. 12. In this preferred embodiment, CPU 410 can only access registers 1215 of ASSPU 505 which are mapped to certain addresses in specialized bank 520. CPU 410 therefore has no "direct" access to specialized bank 520. Instead, CPU 410 writes and reads values from the registers 1215 of ASSPU 505. For example, registers 1215 can include an input FIFO register 1230 to which CPU 410 writes and an output FIFO register 1240 from which CPU 410 reads. Continuing with the example, preferably registers 1215 also includes two additional registers 1280 and 1290 readable by CPU 410 which indicate the fullness/emptiness status of FIFO registers 1230 and 1240 respectively. For example, if input FIFO register 1230 has a physical size of 256 bytes, and FIFO 1230 is 20 bytes full, CPU 410 can only write 236 bytes before an overflow occurs. A special bus 1250 connects ASSPU 505 with specialized bank 520. Typically but not necessarily, special bus 550 is wider than the other buses 580 inside logic embedded memory 440 to allow ASSPU 505 maximum utilization of specialized bank 520 and operation at a low frequency. Special bus 1250 is shared by input register 1230, output register 1240 and ASSPU 505. When ASSPU 505 is not accessing specialized bank 520, a TMU 1210 uses the spare cycles to read data from specialized bank 1220 to output FIFO 1240 and to write data from input FITO 1230 to specialized bank 1220.

TMU 1210 distinguishes between access by CPU 410 to regular banks 530 or specialized bank 520, based either on the address or by dedicated signals connected to the control logic as was discussed above.

TMU 1210 controls a de-multiplexer 1260 and a multiplexer 1270. De-multiplexer 1260 has one input from data input buffer 540 and two outputs, data bus 580 or FIFO input register 1230, depending on a control signal from TMU 1210. Multiplexer 1270 has two inputs (from data bus 580 or from FIFO output register 1240) and one output to data output buffer 545. A control signal from TMU 1210 selects which of the two inputs will be transferred to data output buffer 545. Note that in the preferred embodiment illustrated in FIG. 12, CPU 410 can access register 1215 which are mapped to certain addresses in specialized bank 520 at the same time that ASSPU 505 can access specialized bank 520.

The steps of an example of a video decompression by system 400 will now be explained with reference to FIG. 6. CPU 410 notifies ASSPU 505 that a new compressed frame has started to be inputted into memory in step 602. Notification can be for example via a command data word that is delivered across the external interface between memory 440 and CPU 410. The compressed frame begins to be inputted into memory. Typically although not necessarily, the order of the data in the frame is pre-defined but otherwise the address can be used to indicate which part of the frame is being written or a special prefix can be used for the data. Depending on the preferred embodiment, the compressed frame can be written to specialized bank 520 or to input FIFO register 1230. In step 604, ASSPU 505 begins decompressing the new frame. In step 608, ASSPU 505 asserts a flag for notifying CPU 410 that first segment of video is ready (in this example, decompressed). The flag can be asserted for example, by writing to control memory locations in specialized bank 520 or to control registers external to bank 520 but mapped to addresses in bank 520. CPU 410 periodically polls those control memory locations or control registers (step 606). As another example (not illustrated in FIG. 6) ASSPU 505 signals to CPU 410 that certain portions of the data are already processed by using dedicated signals in the interface between CPU 410 and logic embedded memory 440, for example to interrupt CPU 410. In step 610, CPU 410 reads the ready decompressed segments, depending on the preferred embodiment from specialized bank 520 or from output FIFO register 1240. Further processing by CPU 410 of the read segments, for example transmitting the ready segments, storing the segments on a SIM card or other type of memory such as flash, hard disk, etc., and/or displaying the segments on LCD 120 or an equivalent display module are out of the scope of the invention.

Steps 610, 612, 614 and 616 are repeated for each subsequent segment in the frame. In step 618, CPU 410 completes the waiting of the current frame to memory. In step 620, ASSPU 505 asserts a flag noticing CPU 410 that the last segment is ready. In step 622, CPU 410 starts writing the next compressed frame to memory. Note that the writing of the next compressed frame can occur before reading the last ready segment of the previous frame. In step 624, CPU 410 notifies ASSPU 505 that a new compressed frame has started to be inputted into memory. In step 626, ASSPU 505 begins decompressing the new frame and the process begins anew.

In an alternative functional flow, there are no or less notifications between CPU 410 and ASSPU 505. For example, assuming an internal structure as illustrated in FIG. 12, CPU 410 can realize that there are ready segments based on reading emptiness register 1290 associated with output FIFO 1240. Similarly, because ASSPU 505 has full access to specialized bank 520, ASSPU 505 can periodically check whether any new data has been inputted into specialized bank 520 which requires processing. Therefore in this alternative functional flow one or more of steps 608, 614, 620, 624, and the notification pat of step 602 may be omitted. In addition, step 606 can be replaced by a step of CPU 410 checking emptiness register 1290 associated with output FIFO 1240.

Figure 7:
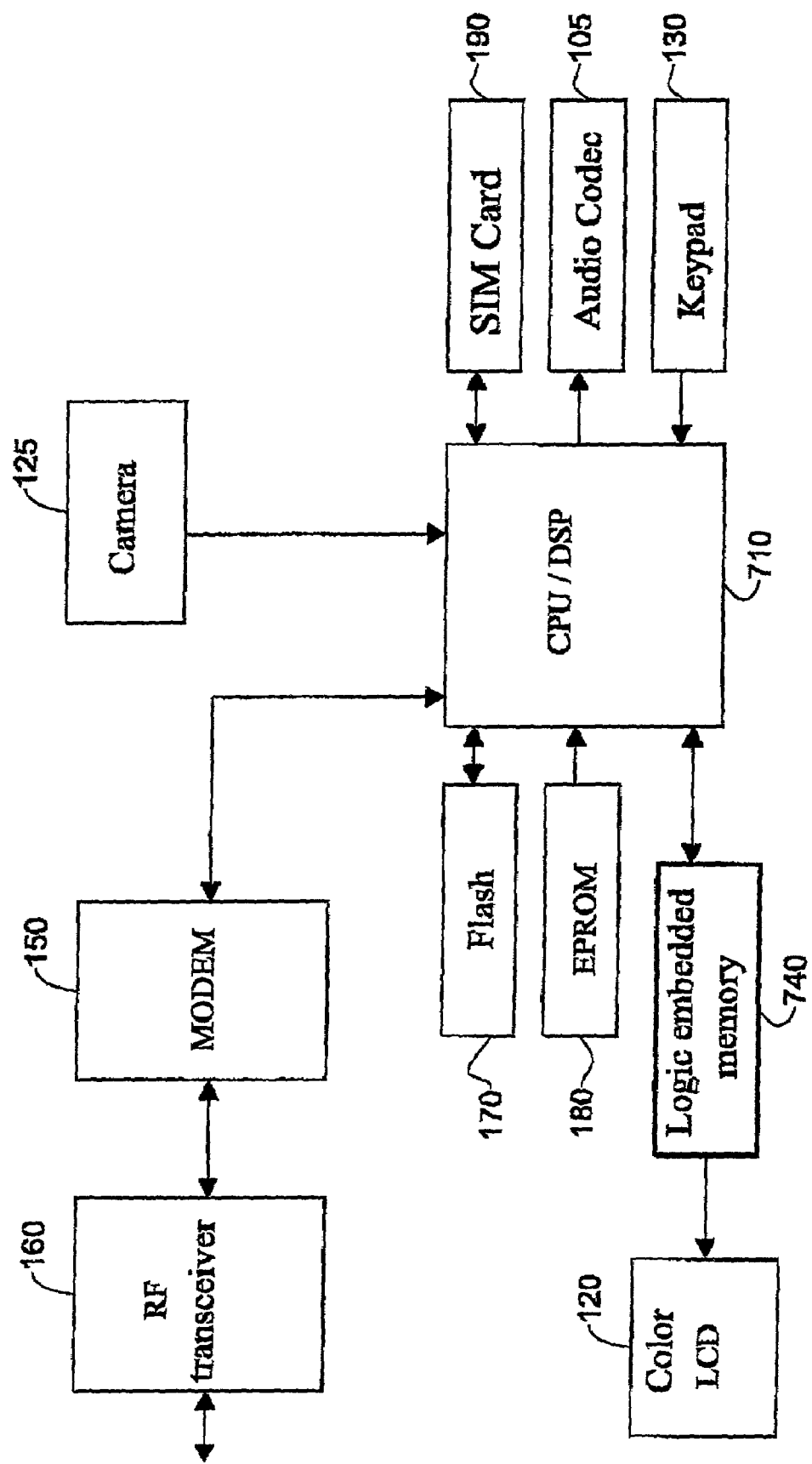
FIG. 7 is a block diagram of a cellular phone with video capability, according to another preferred embodiment of the present invention.

FIG. 7 illustrates another preferred embodiment of a cellular telephone with video capability in accordance with the present invention, where the data to be displayed is not read by CPU 710 but instead directly fed forward to LCD 120 by a logic embedded memory 740. The software of CPU 710 can be simpler than the software of CPU 410 because the task of reading the data and sending the data to LCD 120 can be offloaded. In this preferred embodiment, the logic embedded memory 740 IC does not have the pin-out of a standard DRAM chip and the architecture differs from the well accepted legacy architecture (in contrast to one preferred implementation of the embedded memory 440 IC). For example, in one preferred embodiment, in addition to the pins of a standard DRAM the pin-out of the embedded memory 740 IC may include the following extra pins:

VLCK—video pixel clock (output)
VS—Vertical video sync (output)
HS—Horizontal video sync (output)
Data[7:0]—video pixel data (8 output pins)

Figure 6:
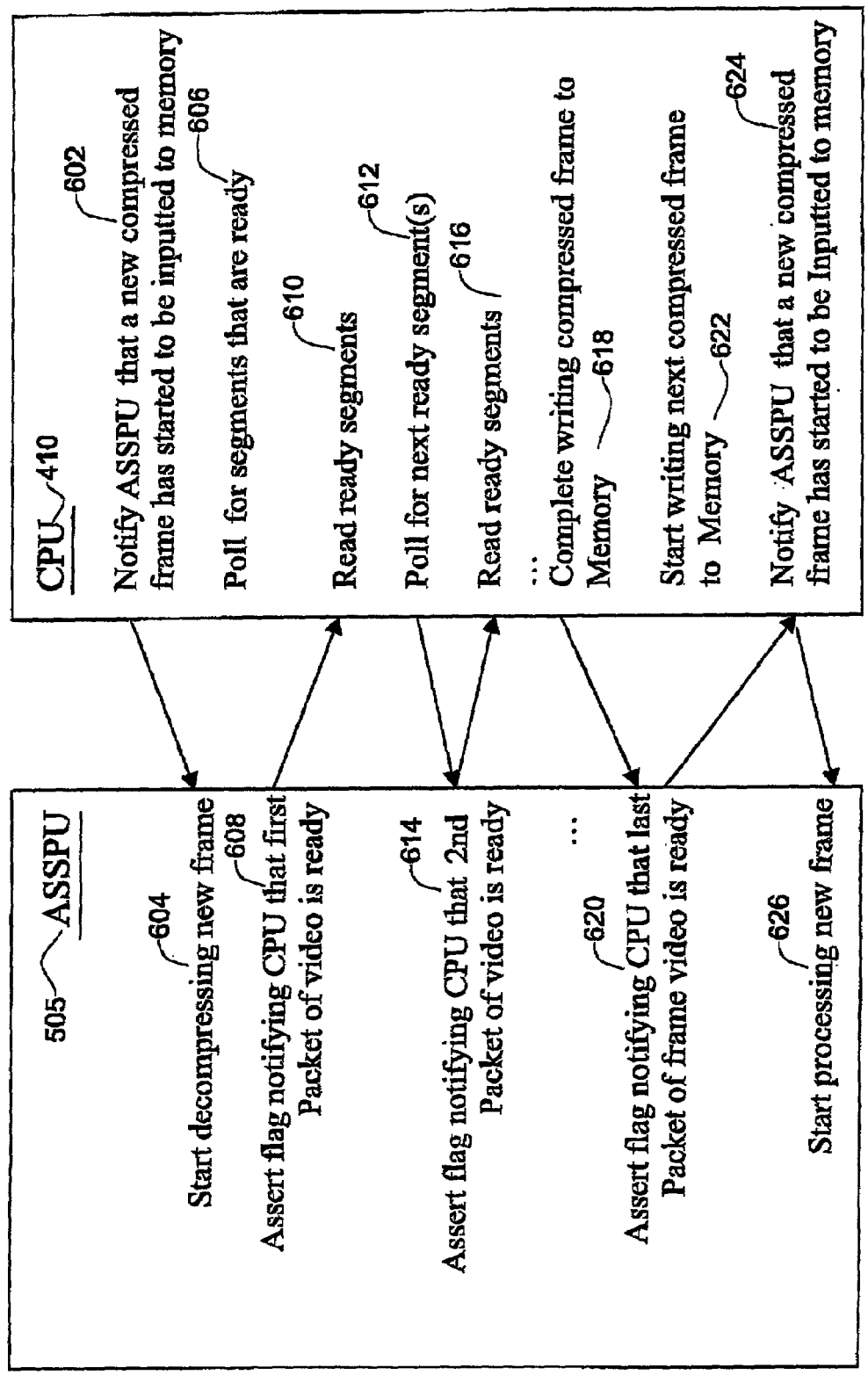
FIG. 6 is a functional computation flow diagram between a CPU and an embedded ASSPU, according to a preferred embodiment of the present invention.

The process of CPU 710 writing data to logic embedded memory 740 is similar to the process illustrated in FIG. 6. However, instead of CPU 710 reading data from embedded memory 740 for further transfer to LCD 120, the data is transferred directly from logic embedded memory 740 to LCD 120.

Figure 13:
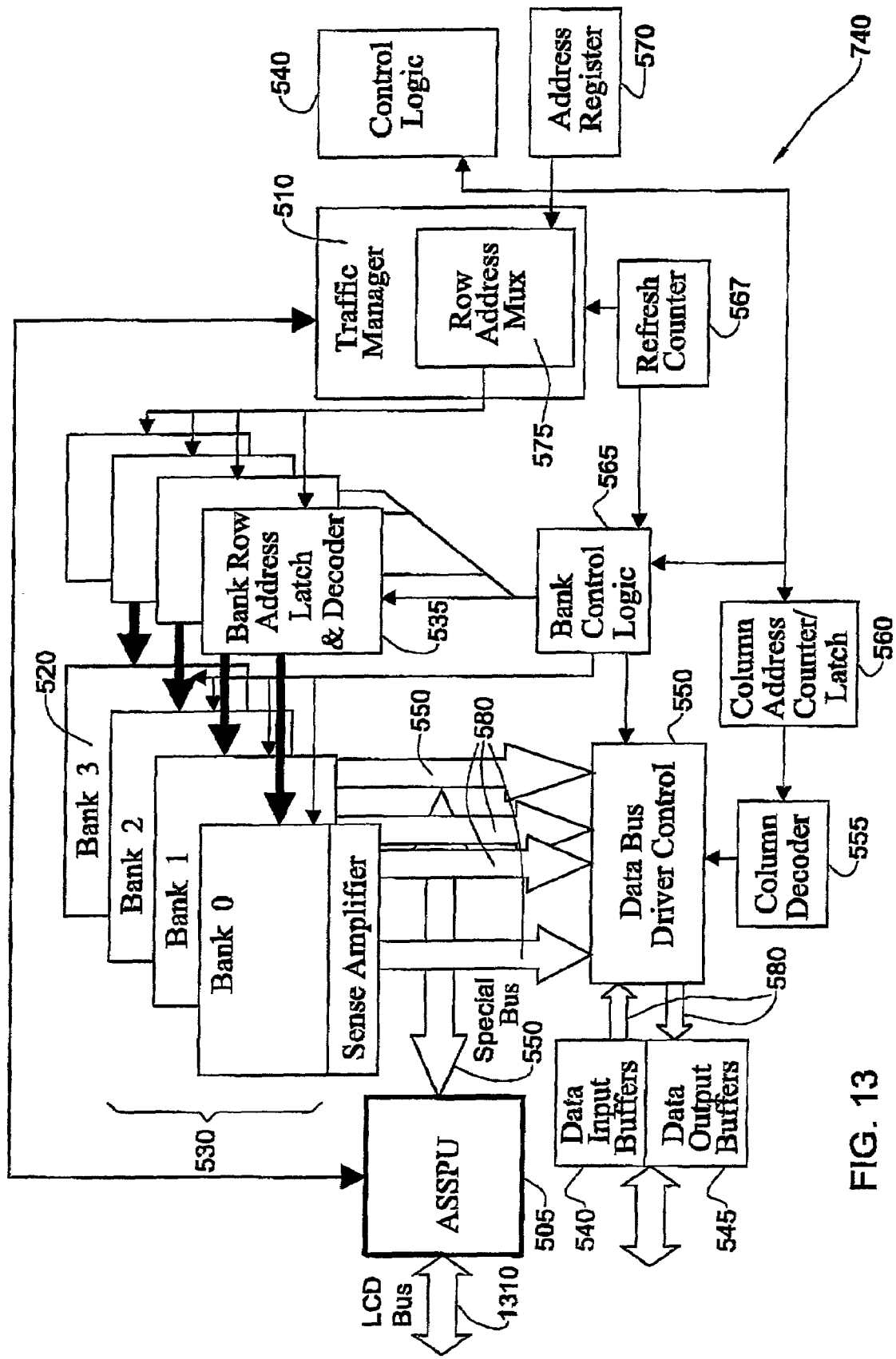
FIG. 13 is a block diagram of the internal structure of a logic embedded memory, according to another preferred embodiment of the present invention.
Figure 14:
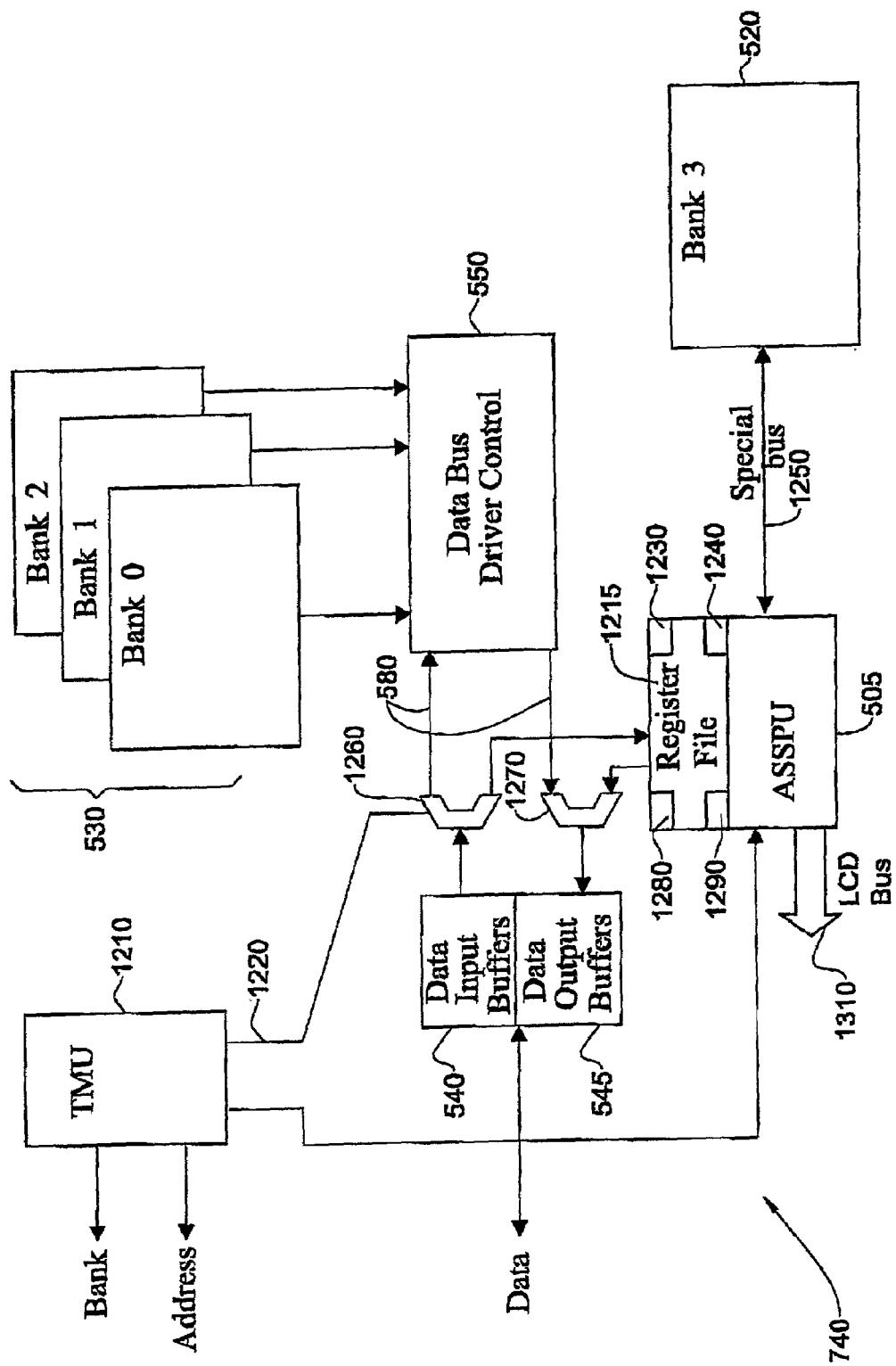
FIG. 14 is a block diagram of the internal structure of a logic embedded memory, according to another preferred embodiment of the present invention.

FIG. 13 shows an example of the internal configuration of embedded memory 740, in accordance with a preferred embodiment of the present invention. FIG. 14 illustrates an alternative internal configuration of embedded memory 740, in accordance with another preferred embodiment of the present invention.

In FIGS. 13 and 14, embedded memory 740 includes an additional LCD bus 1310 coupled to ASSPU 505 in order to allow direct transfer of the data to LCD 120. Note that in the embodiments illustrated in FIGS. 13 and 14, ASSPU 505 and TMU 510 or TMU 1210 are assumed to be the same and are therefore allocated the same number as in embodiments where there is no LCD bus 1310. However in alternative preferred embodiments, the ASSPU and the TMU in the internal configurations of FIGS. 13 and 14 may differ from embodiments where there is no LCD bus 1310.

Figure 8:
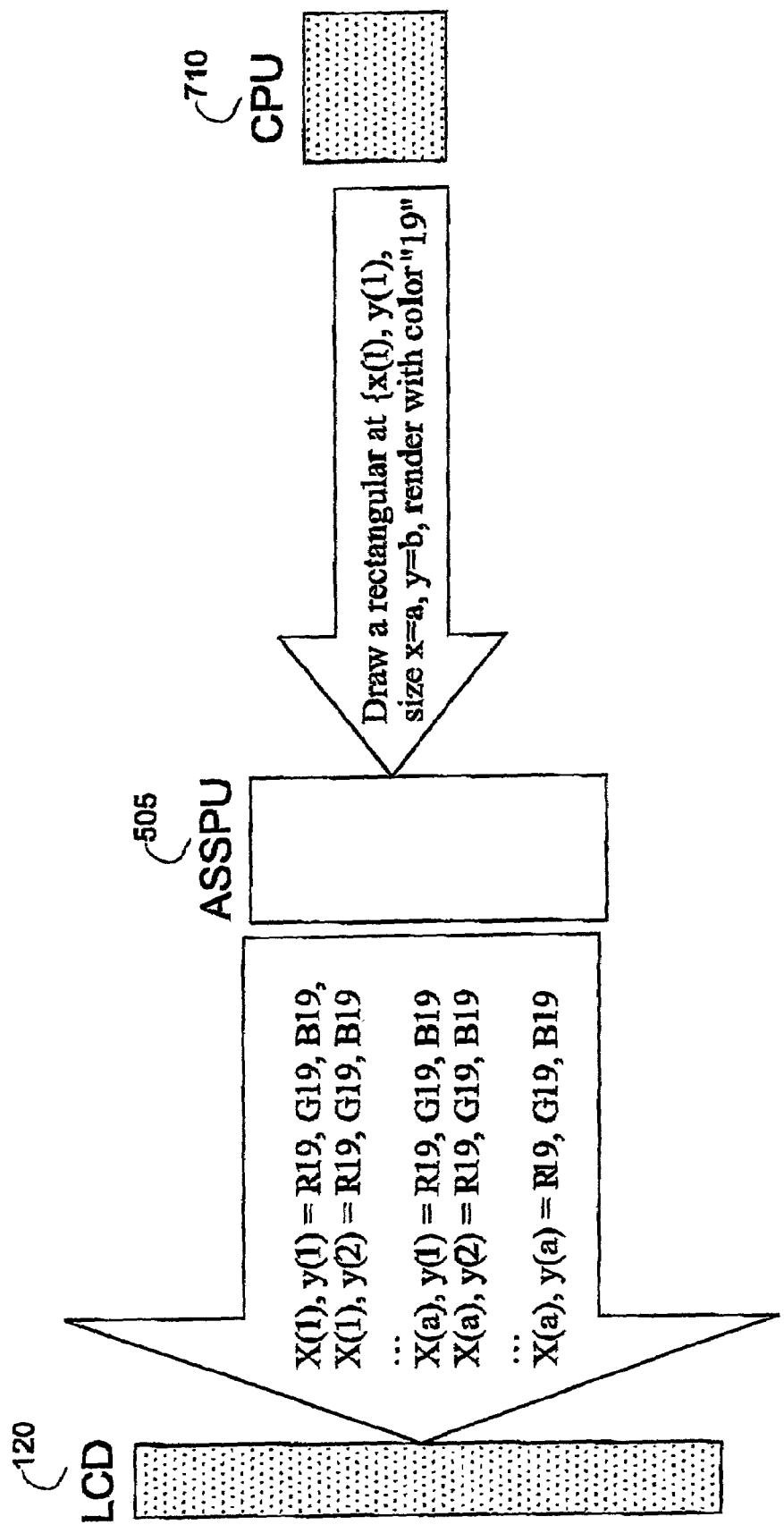
FIG. 8 illustrates a typical processing by a graphics accelerator for a cellular telephone, according to a preferred embodiment of the present invention.

Refer to FIG. 8, which illustrates the processing by a graphics accelerator for a cellular telephone configured as in FIG. 7, in accordance with a preferred embodiment of the present invention. Instead of CPU 710 writing the graphic pixel by pixel, CPU 710 sends an overall command to ASSPU 505 and ASSPU 505 writes the graphic pixel by pixel to LCD 105. The illustration emphasizes the reduction of traffic over the CPU-memory bus.

Recall that in a cellular phone system without the present invention, the processing of the high level graphics command to data exchanges are done within the CPU, or by an application specific signal processor or DSP IC that bridges between the CPU and the LCD. In both cases, the data exchange between the graphics processing logic and memory is intensive and consumes a lot of power. The cellular telephone of the present invention has the graphics processing logic as part of the logic embedded memory IC. This replaces "external" data exchanges between the CPU IC and memory IC with "internal" data exchanges between the ASSPU and part of the memory array on the same IC. Being internal, and at a lower frequency, these internal exchanges consume less power. However, in preferred embodiments where CPU 410 reads the resultant processed data from memory 440 in order to pass the data to LCD 120, the data passes through input/output, and power is consumed. As an example, LCD 120 can require updated data 60 times per second. Therefore the preferred embodiment illustrated in FIGS. 7 and 8 aims at further reducing the consumed power by connecting logic embedded memory 740 directly to LCD 120.

The logic embedded memory of the current invention can be used for other applications as presented in the following preferred embodiments.

Figure 9:
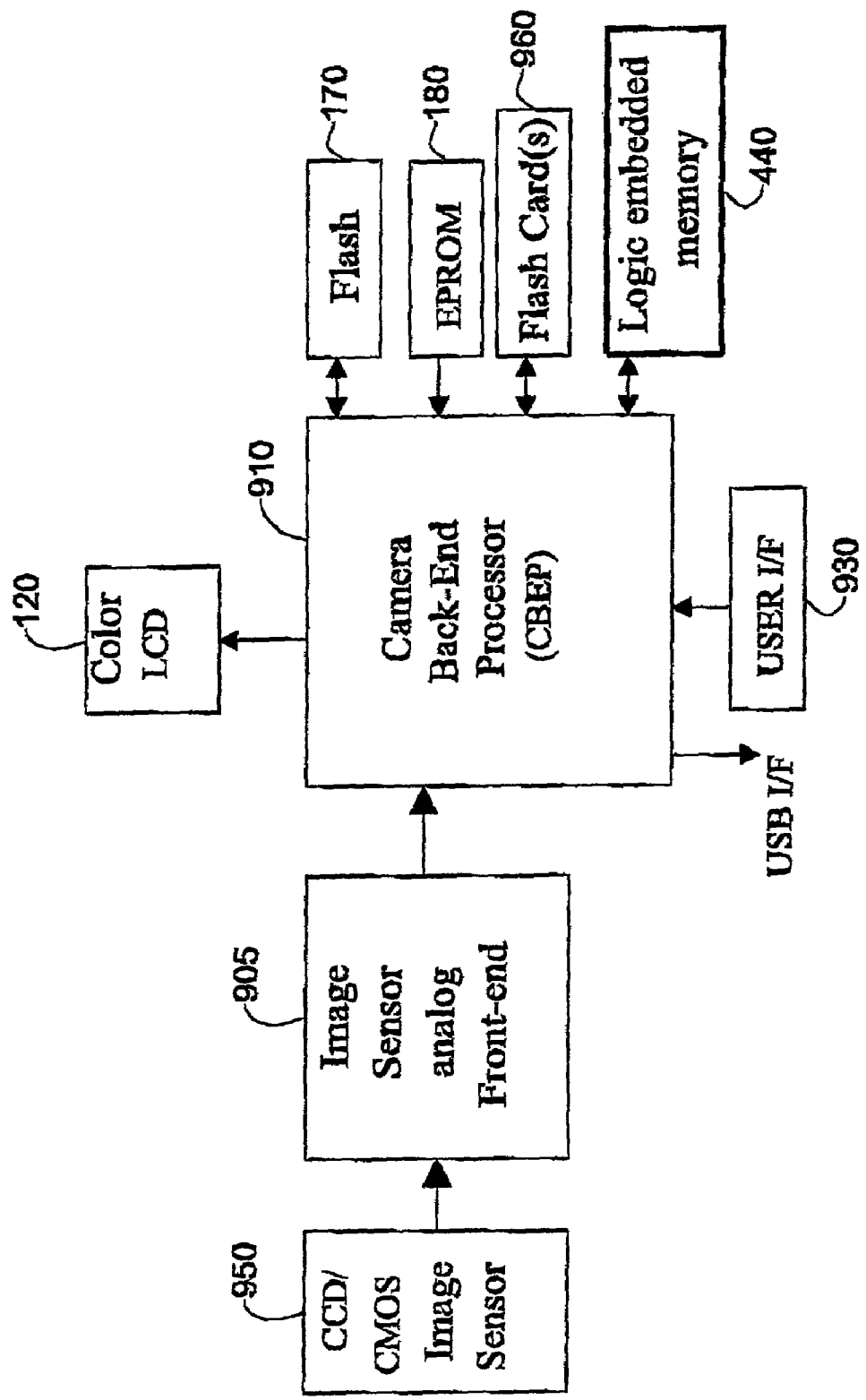
FIG. 9 is block diagram of a digital camera with video capability, according to a preferred embodiment of the present invention.

FIG. 9 illustrates a digital camera system with video capability, in accordance with a preferred embodiment of the present. The illustrated digital camera system can be a digital still camera or a digital video camera. The present invention allows a camera with video capability using the same number of chips as a camera without video capability. The interaction between a camera back end processor CBEP 910 and logic embedded memory 440 is similar to the interaction between CPU 410 and logic embedded memory 440 described with reference to FIG. 4 and therefore FIG. 9 will only be briefly described. CBEP 910 transfers video, image and/or graphics data to logic embedded memory 440.

Such data is distinguished from other (general purpose) data exchanged between CBEP 910 and logic embedded memory 440 either by the address range(s) exhibited on memory address bus of CBEP or by special dedicated signals within the interface between CBEP 910 and logic embedded memory 440. The image/video data is processed by ASSPU 505 (FIG. 5) and temporarily stored within specialized bank 520. Processing can include inter-alia one or more of the following, compression, decompression, filtering, and color-space-conversion. ASSPU 505 optionally signals to CBEP 910 that certain segments have already been processed and are ready by for example, utilizing dedicated signals in the CBEP 910-logic embedded memory 440 interface which can for example be used to interrupt CBEP 910. As another example, ASSPU 505 can signal that segments are ready by letting CBEP 901 poll certain prescribed memory locations, for example control registers mapped to addresses in specialized bank 520. CBEP 910 can then read these processed data segments. As another alternative, CBEP 901 can check the emptiness/fullness to register 1290 associated with output FIFO register 1240. The actions performed by CBEP 910 on the processed data, for example transmitting the packets, storing the packet on a flash card 960, flash memory chip 170 or other types of memory, such as for example a hard disk, or displaying the packets on an LCD 120 or an equivalent display module are out of the scope of the invention. In a preferred embodiment, conflicts between external accesses from CBEP 910 and internal accesses from ASSPU 505 are resolved as described above with reference to FIG. 5. In another preferred embodiment, conflicts are prevented by utilizing the internal configuration of memory 440 illustrated in FIG. 12, so that CBEP 910 accesses registers 1215 instead of specialized bank 520.

Figure 10:
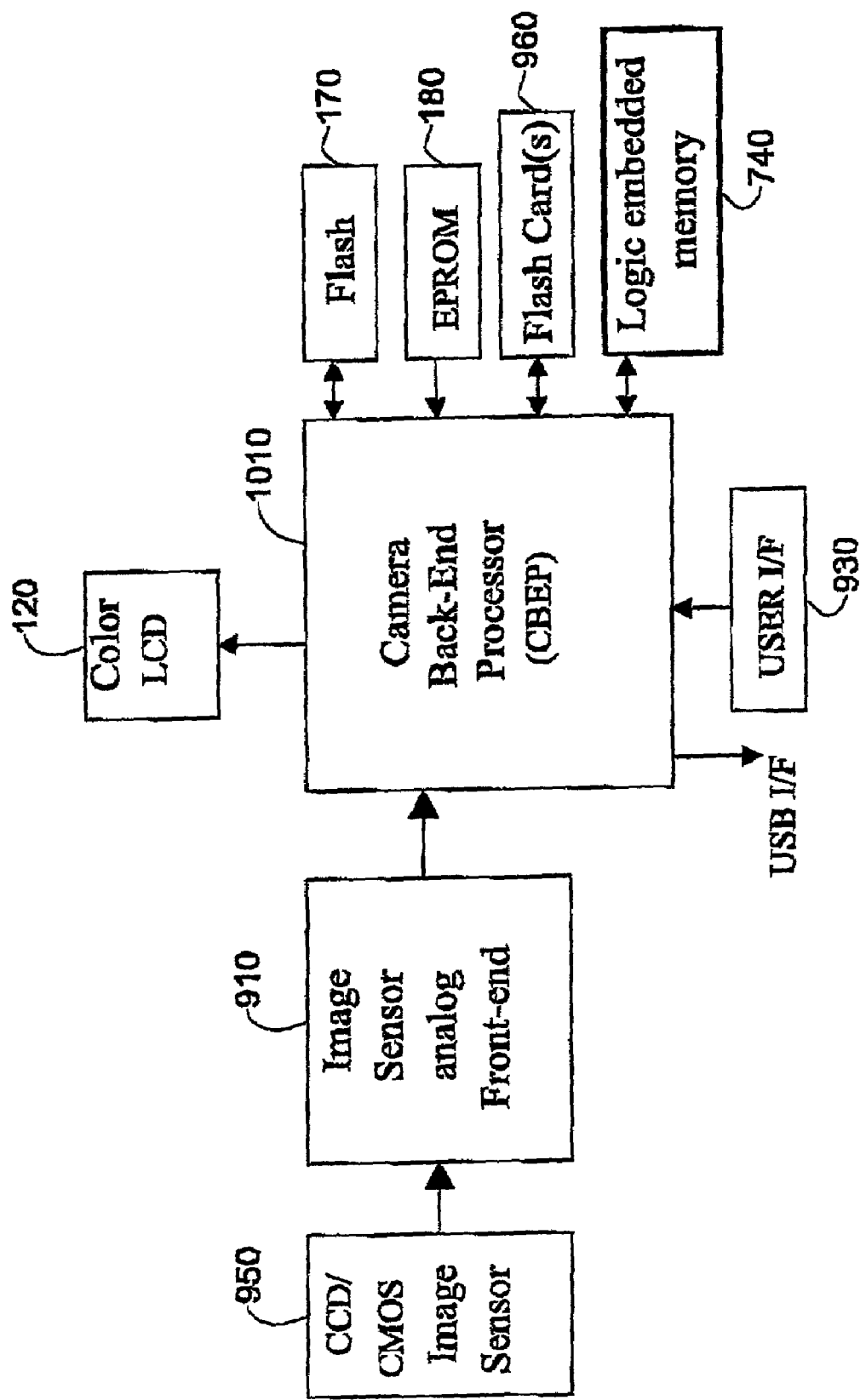
FIG. 10 is a block diagram of a digital camera with video capability, according to another preferred embodiment of the present invention.

CBEP 910 accesses regular banks 530 for regular (general purpose) data exchanges, such as accesses to the On-Screen Display (OSD) memory, graphics frame buffer, etc, for example when the CBEP 910 cache has "misses". FIG. 10 shows a second preferred embodiment of a digital camera system with video capability in accordance with the present invention, where the data to be displayed is not read by CBEP 1010 but instead directly fed forward to LCD 120 by logic embedded memory 740. The software of CBEP 1210 can be simpler than the software of CPU 910 because the task of reading the data and sending the data to LCD 120 can be offloaded. The process of CBEP 1010 writing data to logic embedded memory 740 is similar to the process illustrated in FIG. 9. However, instead of CBEP 1010 reading data from embedded memory 740 for further transfer to LCD 120, the data is transferred directly from logic embedded memory 740 to LCD 120, and therefore there is a saving in power as discussed above.

In some embodiments where the system of FIGS. 9 or 10 is a video camera, the system may include a tape device (not shown) in addition to or instead of flash card 960.

Figure 11:
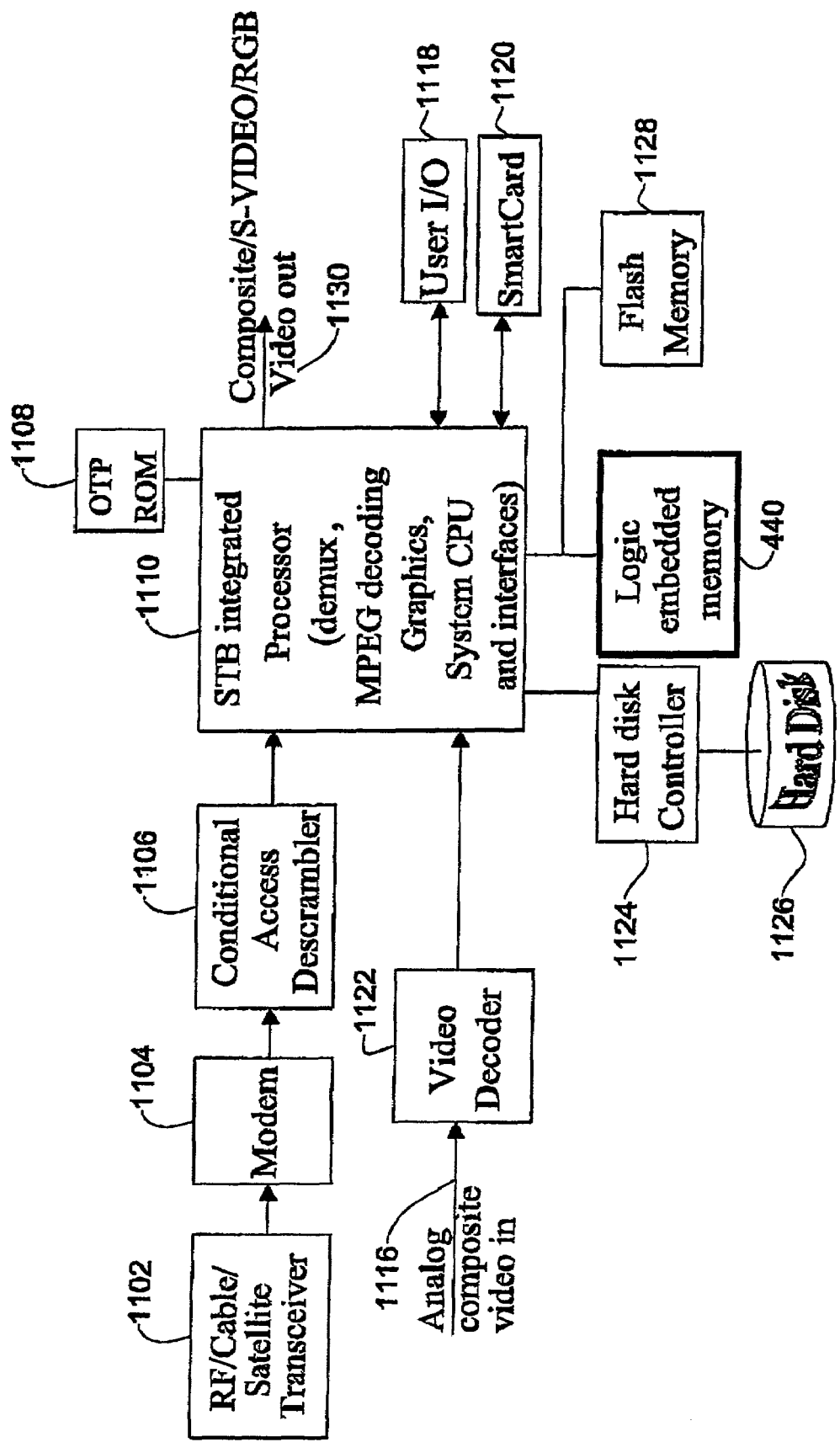
FIG. 11 is a block diagram of a set-top box with personal video recording capability, according to a preferred embodiment of the present invention.

FIG. 11 illustrates a block diagram of a set top box with personal video recording capability for both analog and digital input video, in accordance with a preferred embodiment of the present invention. A common trend in the industry is to equip digital TV set-top boxes for cable or satellite or terrestrial broadcasting, with the capability to record video (and audio) in digital format. This feature is commonly called personal video recording.

When the incoming signal is a compressed digital stream, this feature mainly involves the operation of file formatting and recording. However, when the source is legacy analog TV signal (NTSC/PAL/SECAM) the operation involves (digitization and) high performance MPEG2 compression.

Typically although not necessarily, digital TV set-top box systems have an STB integrated processor that takes care of parsing the incoming bit stream, decompressing the video and sending it for display, decompressing the audio and playing it, and other functions such as graphical user interface, decryption management, electronic programming guide applications, etc. The base-band processor typically although not necessarily uses a large amount of DRAM—128 Mbit and more.

This processor also takes care of recording video and audio when the source is digital and compressed. In order to support the storage of video sourced out of an analog signal, or even to support bit-rate conversion of video sourced out of the digital stream, video compression is needed. The compression standard used in set-top box systems is MPEG2. This standard is very much a memory-intensive and computationally power intensive process.

The addition of logic embedded memory 440 enables video compression. This solution is advantageous compared to the prior art solution of adding a dedicated application specific signal processor plus internal or external DRAM, and thereby increasing IC count, cost, power, and if the DRAM is external then also DRAM redundancy. The solution is also advantageous compared to a second prior art solution of enhancing the STB integrated processor with an MPEG2 compression core and increasing DRAM sufficiently for the MPEG2 compression process, thereby creating a bottleneck of data throughput between the processor and the DRAM. The use of two DRAM IC's in the second prior art solution, one for compression and the other for other tasks with separate busses connecting the processor to the DRAM ICs would solve the bottleneck but at the cost of expense and DRAM redundancy.

Referring to FIG. 11, in the case of recording video sourced from a digital stream, the data is input from an RF receiver 1102 through a modem 1104, optionally decrypted by the conditional access descrambler 1106, and then input to the STB integrated processor 1110, where it is possibly decoded and output for display, but also formatted and sent through a storage medium controller 1124 to a final storage medium 1126. It is assumed in FIG. 11 that final storage medium 1126 is a magnetic hard disk and storage medium controller 1124 is a hard disk controller, but final storage medium 1126 can equivalently be a DVD (digital versatile disk), digital tape, etc with controller 1124 adapted correspondingly.

In the case of recording video sourced in an analog signal 1116, the analog data is digitized and decoded by a video decoder 1122, transferred through set top box STB integrated processor 1110 to logic embedded memory 440. The internal embedded ASSPU 505 compresses the video data. STB integrated processor 1110 transfers the data from logic embedded memory 440 to hard-disk controller 1124, and from there to the hard-disk 1126. In an alternative preferred embodiment, video decoder 1122 can be embedded within STB integrated processor 1110, mutatis mutandis.

As mentioned above, even if the video source is digital, i.e. the video is input compressed, there may be a need for MPEG2 compression, e.g. in order to reduce the bit-rate of the incoming video so as to make it more compact before its storage. This requires nearly a complete MPEG2 process, utilizing logic embedded memory 440 of the present invention.

Alternatively, the compressed video from a logic embedded memory can directly output to a display such as a TV.

It should be noted that although the design of high performance, dense logic processing functions requires a different semiconductor process than the design of high performance dense memory, the cost increment of manufacturing a memory with an ASSPU using a memory-optimized semi-conductor process compared to a memory without an ASSPU is relatively small if the amount of logic is significantly smaller an the amount of memory. The power savings however are relatively large due to the data exchanges being internal between the ASSPU and the specialized bank. To further illustrate the power savings the following example is presented:

$$P_2 = C_{in} * V_{in}^2 * 0.5 * B \text{ where}$$

$C_{in}$ is the internal capacitive load, in Farads.
$V_{in}$ is the internal supply voltage, in Volts.
B is the effective bandwidth of the data transactions, in bits/second
Assume as a typical example: $C_{in} = 1*10^{-12}$ Farad
$V_{in} = 1.5$ Volts
$B = 200*10^6$ bits/sec, thus
$P_2 = 10^{-12} * 1.5^2 * 0.5 * 200 * 10^6 = 0.225$ mW comparing to more than 6.25 mW without the present invention as calculated above.

In addition, if the ASSPU 505 is embedded in DRAM memory and has a wide bus, the invention may allow a saving of SRAM, by replacing SRAM with DRAM, thereby reducing cost because DRAM is more dense than SRAM.

The present invention is especially advantageous under one or more of the following industrial conditions:

1) The system is required to exhibit low power consumption, low IC count (and/or small physical size), and low cost;

2) The semi-conductor area required for implementing the digital signal, processing function (e.g., video compression, decompression, etc.) is much smaller than the semi-conductor area required for implementing the overall memory required for the operation of the CPU and the operation of the digital signal processing function; and/or 3) The required digital signal processing function does not need heavy data exchange with the CPU, relative to the data exchange that the signal processing function requires with memory.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While the invention has been described with respect to a limited number of embodiments, it will be appreciated that many variations, modifications and other applications of the invention may be made.

The invention claimed is:

1. A specialized memory device comprising:
    a memory module, which includes at least two separate memory banks, including at least one specialized memory bank and at least one regular memory bank;
    an application specific signal processing unit ASSPU which is embedded on the same die with said memory module, and has a read/write access to said at least one specialized memory bank via an internal bus, said ASSPU configured to execute at least one pre-determined task;
    a bus interface coupling an external main processing unit to said memory module, wherein said bus interface enables said main processing unit to access at least one control register of said ASSPU at a predefined address of said at least one specialized memory bank in respect of data related to at least one of said predetermined tasks executable by said ASSPU, and enables said main processing unit to access said at least one regular memory bank; and
    a traffic management unit TMU which allows simultaneous access to at least one of said at least one specialized bank and at least one of said at least one regular memory bank by said ASSPU and said main processing unit respectively.

2. The specialized memory device of claim 1, further comprising: a bus interface coupled to an external display device, wherein said at least one specialized memory bank includes sufficient memory area for storing a full frame of display data.

3. The specialized memory device of claim 1, wherein said TMU determines which bank of said at least one specialized memory bank and said at least one regular memory bank said main processing unit desires to access based on whether said main processing unit desires to access said at least one control register of said ASSPU.

4. The specialized memory device of claim 1, wherein said bus interface to said main processing unit conforms with an industry standard for a bus interface between a memory module without said embedded ASSPU and said main processing unit.

5. The specialized memory device of claim 1, wherein said memory module is a dynamic random access memory DRAM and said main processing unit is selected from a group including at least a central processing unit CPU and a digital signal processor DSP.

6. The specialized memory device of claim 1 wherein said main processing unit is configured to execute an application and to allocate through said interface memory intensive sub-applications of said application to said ASSPU.

7. The specialized memory device of claim 6 wherein said application includes video and/or graphics.

8. The specialized memory device of claim 1 for use in a system that includes a module that accommodates said main processing unit.

9. The specialized memory device of claim 8, wherein said system is selected from a group including at least: a cellular telephone, a digital video camera, a digital still camera, and a set-top box.

10. A method for sharing memory in a memory module between a main processing unit and an application specific signal processing unit ASSPU which is embedded on the same die as the memory module, wherein the memory module includes at least one bank shared by the main processing unit and the ASSPU and at least one non-shared bank accessible by the main processing unit, the method comprising:
    determining whether the main processing unit desires to access a control register of said ASSPU at a predefined address of a bank of the memory module which is shared by the main processing unit and by the ASSPU, in respect of data related to a predetermined task executable by the ASSPU; and
    if said determination is that the main processing unit desires to access a non-shared bank of the memory module, allowing access to said non-shared bank by the main processing unit and allowing the ASSPU to access said shared bank simultaneously.

11. The method of claim 10, further comprising: if said determination is that the main processing unit desires to access a shared bank, signaling said ASSPU to release access of said shared bank, if necessary, and preventing said ASSPU from accessing said shared bank while the main processing unit accesses said shared bank.

12. A computer program product having a computer code portion stored thereon for performing the method steps of claim 10.

13. A specialized memory device comprising:
a memory module, which includes at least one specialized memory bank;
an application specific signal processing unit ASSPU, which is embedded on the same die with said memory module, and has a read/write access to said at least one specialized memory bank via an internal bus, said ASSPU configured to execute at least one pre-determined task;
a bus interface coupling a main processing unit to said memory module, wherein said bus interface enables said main processing unit to access at least one control register of said ASSPU at a predefined address of said at least one specialized bank; and
a traffic management unit TMU which controls simultaneous access to said at least one control register and said at least one specialized memory bank by said main processing unit and said ASSPU respectively, said at least one specialized memory bank including said predefined address.

14. The specialized memory device of claim 13 wherein said memory module also includes at least one regular bank and said bus interface also enables said main processing unit to access at least one of said at least one regular memory banks and wherein said TMU allows access to at least one of said at least one specialized bank by said ASSPU simultaneously with access to at least one of said at least one regular memory bank by said main processing unit.

15. The specialized memory device of claim 13, further comprising:
a special bus for said ASSPU to access said at least one specialized bank,
wherein said at least one control register includes an input FIFO register and an output FIFO register and
wherein during spare cycles when said ASSPU is not using said special bus to access said at least one specialized bank, said TMU uses spare cycles on said special bus to write from said input FIFO register to at least one of said at least one specialized bank and reads from at least one of said at least one specialized bank to said output FIFO register.

16. The specialized memory device of claim 13, further comprising:
a bus interface coupled to an external display device, wherein said at least one specialized memory bank includes sufficient memory area for storing a full frame of display data.

17. The specialized memory device of claim 13, wherein said TMU determines whether said main processing unit desires to access at least one of said at least one specialized bank based on an address range exhibited on a memory address bus of said main processing unit.

18. The specialized memory device of claim 13, wherein said bus interface to said main processing unit conforms with an industry standard for a bus interface between a memory module without said embedded ASSPU and said main processing unit.

19. The specialized memory device of claim 13, wherein said memory module is a dynamic random access memory DRAM and said main processing unit is selected from a group including at least a central processing unit CPU and a digital signal processor DSP.

20. The specialized memory device of claim 13, wherein said main processing unit is configured to execute an application and to allocate through said interface memory intensive sub-applications of said application to said ASSPU.

21. The specialized memory device of claim 20, wherein said application includes video and/or graphics.

22. The specialized memory device of claim 13, for use in a system that includes a module that accommodates said main processing unit.

23. The specialized memory device of claim 22, wherein said system is selected from a group including at least: a cellular telephone, a digital video camera, a digital still camera, and a set-top box.

24. A method for sharing memory on a memory module between a main processing unit and an application specific signal processing unit ASSPU which is embedded on the same die as the memory module and is configured to execute at least one pre-determined task, the memory module including at least one specialized memory bank, the method comprising:
determining whether the main processing unit desires to access a predetermined address in one of said at least one specialized memory bank;
if said determination is that the main processing unit desires to access said predetermined address in one of said at least one specialized memory bank, allowing access to a control register of said ASSPU at said predetermined address by the main processing unit; and
during said main processing unit access, allowing said ASSPU to access said one specialized bank which includes said one address, if said ASSPU so desires.

25. A computer program product having a computer code portion stored thereon for performing the method steps of claim 24.

26. A method for sharing memory on a memory module between a main processing unit and an application specific signal processing unit ASSPU which is embedded on the same die as the memory module and is configured to execute at least one pre-determined task, the memory module including at least one specialized memory bank, the method comprising:
determining whether the main processing unit desires to access one of at least one specialized memory bank;
if said determination is that the main processing unit desires to access one of said at least one specialized memory bank, allowing the main processing unit to access a control register of said ASSPU at a predefined address of said one specialized bank; and
during said main processing unit access, allowing said ASSPU to access directly said one specialized bank if said ASSPU so desires.

* * * * *